United States Patent [19]
Nakamura et al.

[11] Patent Number: 6,081,672
[45] Date of Patent: Jun. 27, 2000

[54] MEASUREMENT DEVICE

[75] Inventors: Kenji Nakamura, Kasai; Kazumi Kageyama; Yoshito Tanaka, both of Sakai, all of Japan

[73] Assignee: Minolta Co. Ltd., Osaka, Japan

[21] Appl. No.: 09/084,195

[22] Filed: May 26, 1998

[30] Foreign Application Priority Data

May 27, 1997 [JP] Japan .................................. 09-136811

[51] Int. Cl.⁷ .................................................. G03B 13/36
[52] U.S. Cl. ......................................... 396/104; 396/121
[58] Field of Search ................................. 396/121–123, 396/104, 124, 128; 356/3.14, 3.15; 250/201.8

[56] References Cited

U.S. PATENT DOCUMENTS

| | | | |
|---|---|---|---|
| 4,636,624 | 1/1987 | Ishida et al. ........................ | 250/201.8 |
| 5,485,004 | 1/1996 | Suzuki et al. ..................... | 250/201.8 X |
| 5,784,655 | 7/1998 | Akashi et al. ..................... | 396/128 |
| 5,825,016 | 10/1998 | Nagahata et al. ................. | 250/201.8 |

*Primary Examiner*—W. B. Perkey
*Attorney, Agent, or Firm*—Burns, Doane, Swecker & Mathis, LLP

[57] ABSTRACT

A rangefinder provides a rangefinding optical system, and photoreception unit including a pair of photoelectric conversion element arrays, and outputs signals corresponding to the light received by the photoelectric conversion element arrays. The controller allocates the output signals o a plurality of areas, and stores signals included within a single allocated area in memory. The memory has a storage capacity sufficient only to store the allocated data. Data relating to the distance to a rangefinding object are determined by calculations using the data stored in memory.

19 Claims, 7 Drawing Sheets

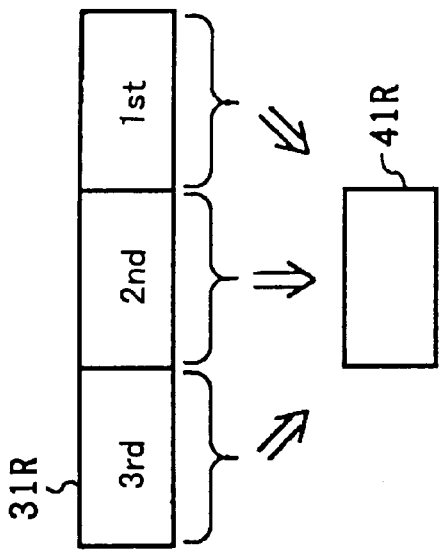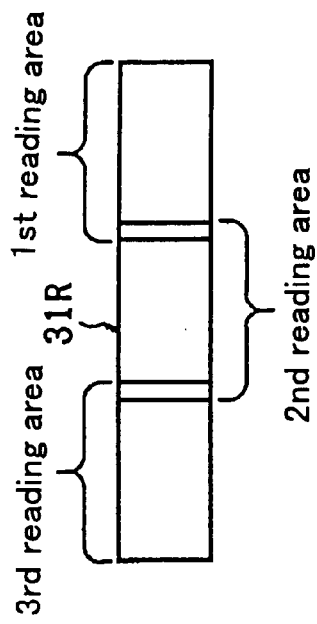
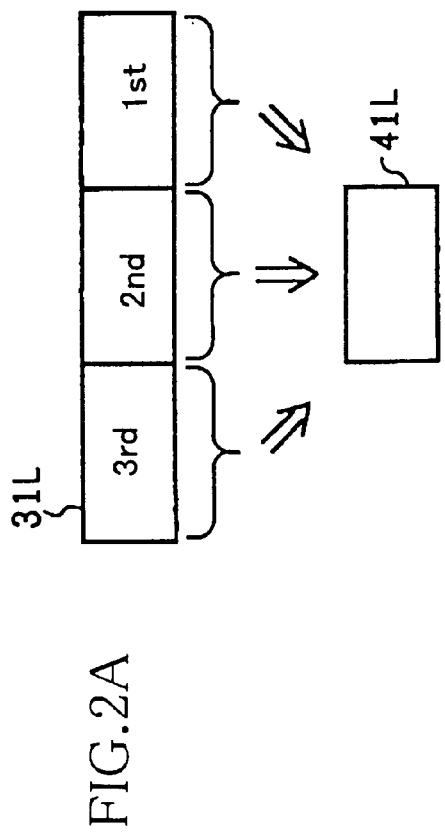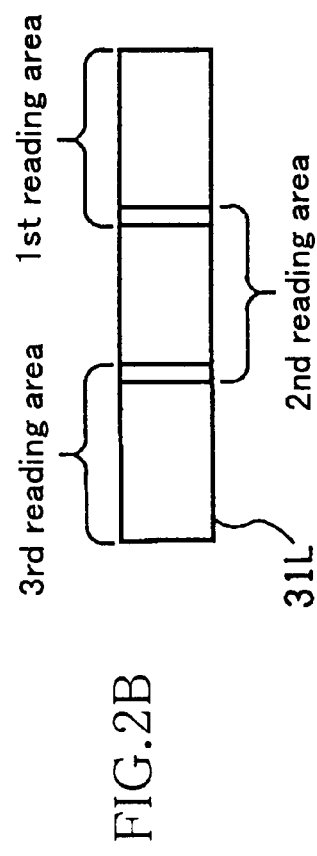
FIG.2A  FIG.2B

MEASUREMENT DEVICE

This application is based on application No. Hei 9-136811 filed in Japan, the content of which is hereby incorporated by reference.

BACKGROUND OF THE INVENTION

1. Field of the Invention

The present invention relates to a measurement device such as a rangefinder to measure the distance to an object and a focus detection device to detect a focus condition of a taking lens, for use in cameras, video cameras and the like.

2. Description of the Related Art

Phase difference detection methods are known to be used as measurement device, rangefideres and focus detection devices, in cameras and the like to measure the distance to an object.

Such rangefinders, for example, are provided with a pair of photoelectric conversion elements (line sensors) as a standard unit (left sensor) and reference unit (right sensor), and further provided with a left memory and right memory having a storage capacities corresponding to the number of elements, i.e., number of pixels, of the left sensors and right sensors.

In the aforesaid construction, an object image (distance information) obtained by photoreception via the left sensor and right sensor is stored in the respective memories as pixel data, then blocks are divided into a plurality of regions in accordance with the obtained pixel data array, and thereafter calculations are executed to determine the correlation value relative to the pixel data between the left sensor and right sensor for each the block, distance data are calculated which correspond to the distance to the measurement object using a plurality of obtained correlation values.

In the aforesaid conventional rangefinder, since photoreception of measurement information of an object is required over a broad measurement range in order to improve measuring precision by increasing the amount of measurement information, a plurality of photoelectric conversion elements are used in the left sensor and right sensor. Therefore, as the number of photoelectric conversion elements increases the storage capacity of the left and right memories must be correspondingly increased, thereby exacerbating the tendency of increasing memory capacity. On the other hand, if memory capacity is restricted, a disadvantage arises insofar as the extension area of the measurement range is limited so as to produce a fixed boundary on precision.

SUMMARY OF THE INVENTION

An object of the present invention is to eliminate the aforesaid disadvantages by providing a measurement device such as a rangefinder and a focus detection device capable of obtaining distance information from a wider ranger without increasing memory capacity.

These objects are attained by the measurement device of the present invention comprises a pair of photoelectric conversion element arrays which receives light from an object; a signal controller which allocates information output from said photoelectric conversion element arrays to a plurality of areas, and output information included in one of said allocated areas; a memory which stores said output information; and a calculator which calculates data corresponding to object distance using information stored in said memory.

The measuring method of the present invention comprises a photoreception step of receiving light from an object by a pair of photoelectric conversion element arrays; a reading step of dividing data corresponding to said received light into a plurality of areas; a storage step of storing data included in said divided areas; and a calculation step of calculating data related to the distance to an object using said stored data.

BRIEF DESCRIPTION OF THE DRAWINGS

These and other objects and features of this invention will become clear from the following description, taken in conjunction with the preferred embodiments with reference to the accompanied drawings in which:

FIG. 2A illustrates the relationship between image signals obtained by the left and right line sensors and the image data stored in the photoreception data storage unit, FIG. 2B illustrates the relationships among the plurality of separate areas;

DETAILED DESCRIPTION OF THE PREFERRED EMBODIMENTS

Figure 1:
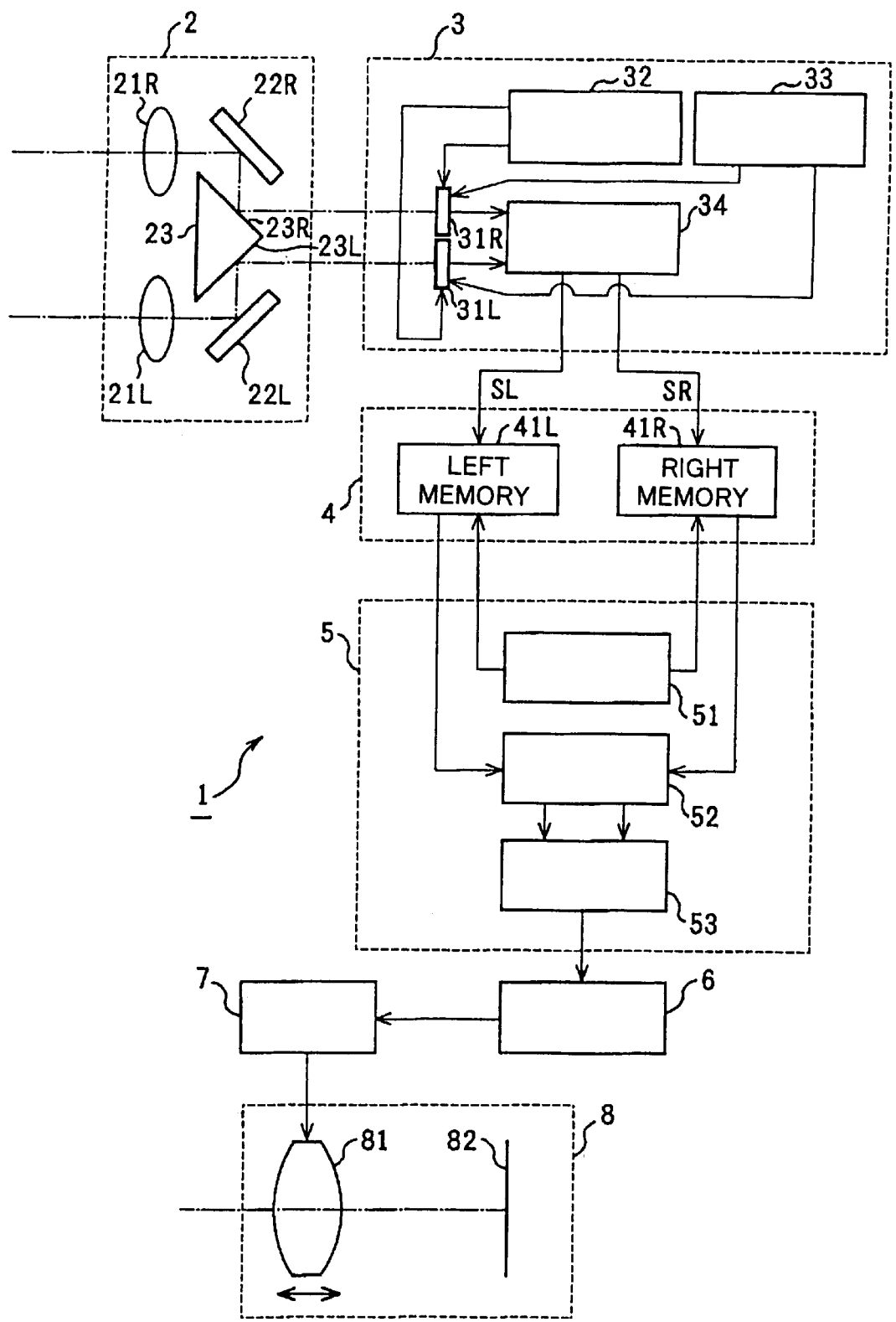
FIG. 1 shows the construction of a camera using a rangefinder of a first embodiment of the invention.

An example of a camera provided with a rangefinder of a first embodiment of the present invention is described hereinafter with reference to FIG. 1 which illustrates the construction. Camera 1 is provided with a rangefinder system comprising a rangefinder optical unit 2, a photoreception unit 3 provided with a pair of left and right line sensors 31L and 31R, photoreception data memory unit 4, and rangefinding calculation unit 5, and is further provided with a drive signal generator 6, drive unit 7, and image forming lens 81 and the like. Excluding the left and right line sensors 31L and 31R and an analog-to-digital (A/D) converter not shown in the drawing, the photoreception unit 3, rangefinding data calculation unit 5, and drive signal generator 6 comprise, for example, microcomputers, which specify writing and reading of predetermined image data in photoreception data memory unit 4.

Rangefinder optical unit 2 comprises a pair of left and right lenses 21L and 21R, a pair of left and right mirrors 22L and 22R, and a prism 23. Left and right lenses 21L and 21R respectively have optical axes which are parallel to the optical axis of an image forming lens 81 described later, and are arranged so as to be separated by a predetermined distance. Left and right mirrors 22L and 22R are disposed an inclination of 45 degrees relative to the optical axis of left and right lenses 21L and 21R. Prism 23 is disposed between left and right mirrors 22L and 22R, and reflective surfaces 23L and 23R are formed on the bilateral surfaces of prism 23 to reflect incidence light at a right angle, and the dimensions between the optical axes of left and right lenses 21L and 21r are narrow so as to direct the reflected light backward. According to this construction, light arriving from the same object forms an image on the photoreceptive surfaces of left and right line sensors 31L and 31R.

Photoreception unit 3 comprises left and right line sensors 31L and 31R, photoreception controller 32, reading controller 33, and signal processor 34, and is used to calculate rangefinding data corresponding to the distance between the camera 1 and a rangefinding object (photographic subject) to produce image information of the object.

The left and right line sensors 31L and 31R are disposed behind the prism 23, and arranged in a line and separated by a predetermined distance at the image forming positions of right and left lenses 21L and 21R. Left and right line sensors 31L and 31R respectively have a required number of photoreceptor elements (photoelectric conversion elements) arranged in linear array, such that each the element accumulates a charge corresponding to the amount of light of the photographic subject image formed on the photoreceptor surface of each the element. That is, the photoreceptor elements form linear image signals of the object by accumulating pixel signals (photoreception signals) from the photoreceptors corresponding to pixels.

Photoreception controller 32 executes charge accumulation operations relative to the various photoreceptor elements of left and right line sensors 31L and 31R at predetermined intervals and with predetermined timing.

Reading controller 33 reads image signals from part of the various regions of left and right line sensors 31L and 31R in time series and in correspondence with the reading start address and read pixels number, and transmits the read image signals to the image processor 34.

Image processor 34 subjects the various image signals transmitted from left and right line sensors 31L and 31R to predetermined analog processing (signal amplification and offset adjustment), and subjects the resulting image signals to analog-to-digital (A/D) conversion to obtain digital value image data (photoreception data).

Photoreception data memory unit 4 comprises left and right memories 41L and 41R, which respectively have storage capacities sufficient to store a required number of pixel data. A calculation process is executed to calculate the rangefinding data (described later) using the aforesaid required pixel data, i.e., image data, stored in the left and right memories 41L and 41R.

The relationship between the image signals obtained by left and right line sensors 31L and 31R and the image data stored in photoreception data memory unit 4 of the aforesaid construction is described below with reference to FIGS. 1 and 2A. The photoreception region of left and right line sensors 31L and 31R are allocated among a plurality of equal reading areas. In the present embodiment, the photoreception region of left and right line sensors 31L and 31R respectively allocated into three reading areas comprising first, second, and third reading areas, as shown in FIG. 2A. That is, image signals are read from the first, second, and third reading regions of the left and right line sensors 31L and 31R, and subjected to predetermined processing by signal processor 34, and are subsequently stored in left and right memories 41L and 41R. More specifically, reading regions are specified as reading objects as (first reading region of left line sensor 3L: first reading region of right line sensor 31R), (second reading region of left line sensor 31L: second reading region of right line sensor 31R), (third reading region of left line sensor 31L: third reading region of right line sensor 31R) relative to the first, second, and third reading regions of the left and right line sensors 31L and 31R in accordance with the reading start address and number of reading pixels of reading controller 33. After image signals are read from the specified reading regions, the read image signals are subjected to predetermined processing by signal processor 34, and subsequently stored in left and right memories 41L and 41R. The left and right memories 41L and 41R have about ⅓ the storage capacity relative to the number of photoreceptor elements corresponding to the pixels of left and right line sensor 31L and 31R, thereby reducing the storage capacity.

In the case of a line sensor which can only read image signals from the top photoreceptor element of left and right line sensors 31L and 31R, the reading controller 33 may be constructed so as to control the timing for writing to the left and right memories 41L and 41R in accordance with the aforesaid reading start address and number of read pixels. For example, left and right memories 41L and 41R may read data only when image data of a reading region (i.e., first, second, or third reading region) are transmitted from the signal processor 34.

In the present embodiment, the reading controller 33 uses the reading start address and reading pixel number to specify the reading region in the sequence of the first reading region, second reading region, third reading region, but the present invention is not limited to this arrangement, and the reading start address and reading pixel number may be used to specify the reading region in, for example, the sequence of the second reading region, first reading region, third reading region and the like.

Although the reading controller 33 is constructed to use the reading start address and reading pixel number to specify a specific reading region relative to the first, second, and third reading regions comprising equal or nearly equal divisions, as shown in FIG. 2A, the present invention is not limited to this arrangement and the reading controller 33 may be constructed to use the reading start address and reading pixel number to specify a specific reading region relative to first, second, and third reading regions divided so as to have adjacent region partially overlap, as shown in FIG. 2B.

The number of photoreceptor elements corresponding to the pixels included in the first reading region, second reading region, and third reading region may be mutually different, although it is desirable that the number of photoreceptor element be the same to reduce the memory capacities.

Returning now to FIG. 1, the rangefinding data calculation unit 5 comprises a reading controller 51, correlation calculator 52, and distance calculator 53.

Reading controller 51 specifies the pixel data readout used for the rangefinding calculation relative to the left and right memories 41L and 41R. In the present embodiment, when the number of memory pixels of the left and right memories 41L and 41R are designated "n," the reading controller 51 is constructed to specify the top pixel address (reading start address) of a pixel block so as to shift the blocks comprising a data line including a plurality of pixel data (a predetermined number less than n) alternately 1 pitch (corresponds to 1 pixel), i.e., shift from one end to another end of the left and right memories 41L and 41R, and transmit the data line within a specific block specified by the top pixel address to the correlation calculator 52. More specifically, the reading controller 51 specifies the top starting address in sequential correspondence such that the top starting address of left memory 41L is specified in the sequence of a first pixel address, first pixel address, second pixel address, second pixel address and the like, whereas the top starting address of right memory 41R is specified in the sequence of a pixel address n, pixel address n-1, pixel address n-1, pixel address n-2, pixel address n-2 and the like. The first pixel address indicates the starting pixel address of the memory, and pixel address n indicates the ending pixel address of the memory. As a result, a specific block specified as described above is alternately shifted 1 pitch from either the starting end or ending end to the other end of left and right memories 41L and 41R.

Correlation calculator 52 executes a correlation calculation process using a data line read from left and right memories 41L and 41R. In the present embodiment, correlation calculator 52 reads a data line within a block specified by the starting pixel address specified by reading controller 51 from left and right memories 41L and 41R, and calculates correlation values using both data lines. More specifically, correlation calculator 52 determines the difference in levels of the pixel data between the read left and right data lines, and sets the sum of the determined level differences as the correlation value. Then, the starting pixel address of one data line is shifted and set as the correlation value. As a result, a correlation value having a starting pixel address specified a number of times by the reading controller 51 is ultimately determined by the correlation calculator 52.

Distance calculator 53 determines the rangefinding data using a plurality of correlation values ultimately determined by correlation calculator 52. Distance calculator 53 a maximum correlativity in the plurality of correlation values ultimately determined by calculating via shifting the top address, and determines rangefinding data (amount of defocus) via predetermined calculations using data of the pitch number (amount of shifting from the top address) of extremely small correlation values. The pitch number data are subjected to predetermined interpolation processing, to determine rangefinding data using the interpolated pitch number data.

Drive signal generator 6 generates drive signals to drive the image forming lens 81 to a focus position using the rangefinding data (amount of defocus) determined by the distance calculator 53.

Drive unit 7 drives the image forming lens 81 in accordance with the drive signals generated by the drive signal generator 6.

Image forming unit 8 accommodates an image forming lens 81 to form an object image at a predetermined image forming position, and film 82 at the image forming position so as to be capable of being reeled up, and has a mechanism for driving. Film 82 may be replaced by a solid state image forming element such as a charge-coupled device (CCD) area sensor arranged so as to have a photoreceptor surface at the image forming position, and a recording means to record image information read by the solid-state image sensing element in a recording means such as a recording medium including magnetic tape, magnetic or magneto-optical disk or the like, or a semiconductor memory element including random access memory (RAM) memory cartridge or the like.

The rangefinding sequence is described below with reference to the FIG. 1 and the flow chart of the first rangefinding sequence of FIG. 3.

Left and right line sensors 31L and 31R start accumulating charge after the charge accumulated on the respective photoreceptive surfaces is reset with a timing corresponding to control signals from photoreception controller 32 (step #10).

After a predetermined time has elapsed following the start of charge accumulation, a control signal to end charge accumulation is transmitted from photoreception controller 32 to the left and right line sensors 31L and 31R (step #20). This ends the photoreception operation, and image signal transmission starts from the left and right line sensors 31L and 31R to the signal processor 34.

After charge accumulation ends, reading controller 33 first sets the charge reading region for each left and right line sensor 31L and 31R using the reading start address and reading pixel number to specify a first reading region (step #30). The respective charges are read separately as image signals from the specific reading regions of the left and right line sensors 31L and 31R specified as per above, and stored in left and right memories 41L and 41R via signal processor 34 (step #40).

Thereafter, the top pixel address is specified for left and right memories 41L and 41R by reading controller 51 (step #50). Data lines within a specific block so specified per above are read separately to correlation calculator 52, which determines the difference in levels of the pixel data of the corresponding pixel positions between the read data lines, and sets the sum of these level differences as a correlation value (step #60).

These processes of steps #50 and #60 are repeated for all remaining top pixel addressees specified by reading controller 51 until the end (step #70).

When the repeated processes in step #70, the correlativity is maximized from a plurality of correlation values determined by correlation calculator 52 so as to determine the pitch number of the minimum correlation value, and determine the rangefinding data using the pitch number data via distance calculator 53 (step #80).

Thereafter, the processes from step #30 to step #80 are repeated for the second reading region and third reading region until the end (step #90).

When the repeated processes end in step #90, the final rangefinding data are selected from the aforesaid determined rangefinding data by distance calculator 53 (step #100). In this instance, after calculating a predetermined reliability for the obtained rangefinding data, distance calculator 53 may select rangefinding data representing the highest reliability value, or select the smallest rangefinding data. Alternatively, distance calculator 53 may select the rangefinding data representing an approximate value, or rangefinding data obtained by averaging.

Figure 4:
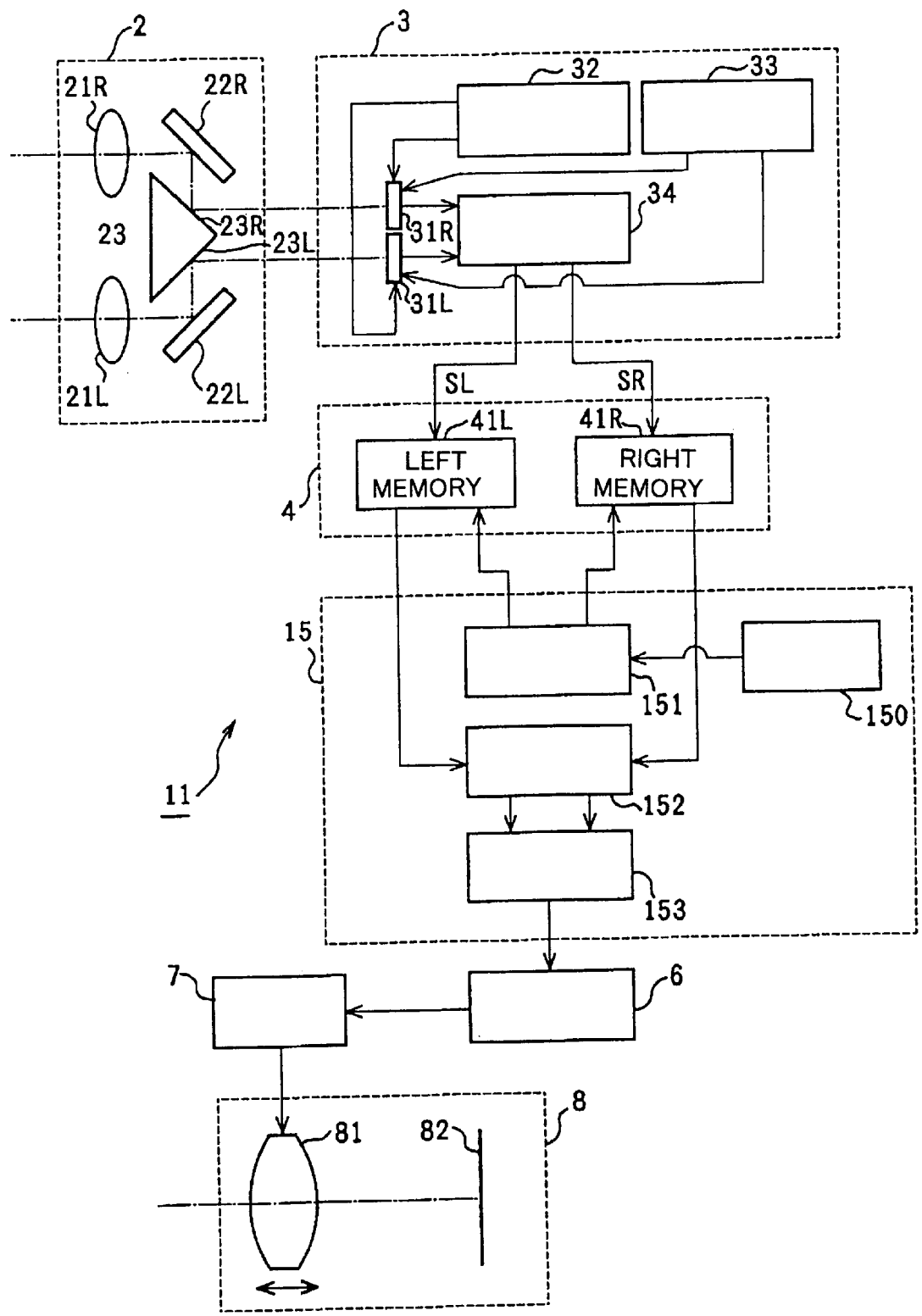
FIG. 4 shows the construction of a camera using a rangefinder of a second embodiment.

A second embodiment of the present invention applied to a camera is described hereinafter with reference to FIG. 4 which shows the construction. Aspects in common with the first embodiment are omitted from the present discussion, and only those aspects which differ from the first embodiment are described hereinafter. In camera 11, a rangefinding data calculator 15 is provided with a reading region specification unit 150 in addition to a reading controller 151, correlation calculator 152, and distance calculator 153 which operate identically to their counterparts in the first embodiment.

Reading region specification unit 150 specifies the reading region of left and right memories 41L and 41R from which pixel data are read out by reading controller 151 for use by the distance calculator. That is, the reading region of the left and right memories 41L and 41R are specified so as to shift from one end to another end within the respective regions of the left and right memories 41L and 41R.

Reading controller 151 specifies the readout of pixel data used in the distance calculation in the same manner as in the first embodiment for each reading region of left and right memories 41L and 41R specified by the reading region specification unit 150.

Correlation calculator 152 executes the process of correlation calculations in the same manner as in the first embodiment using data lines read from the left and right memories 41L and 41R.

Distance calculator 153 determines the rangefinding data using a plurality of correlation values ultimately determined by the correlation calculator 152 in the same manner as in the first embodiment.

Figure 5:
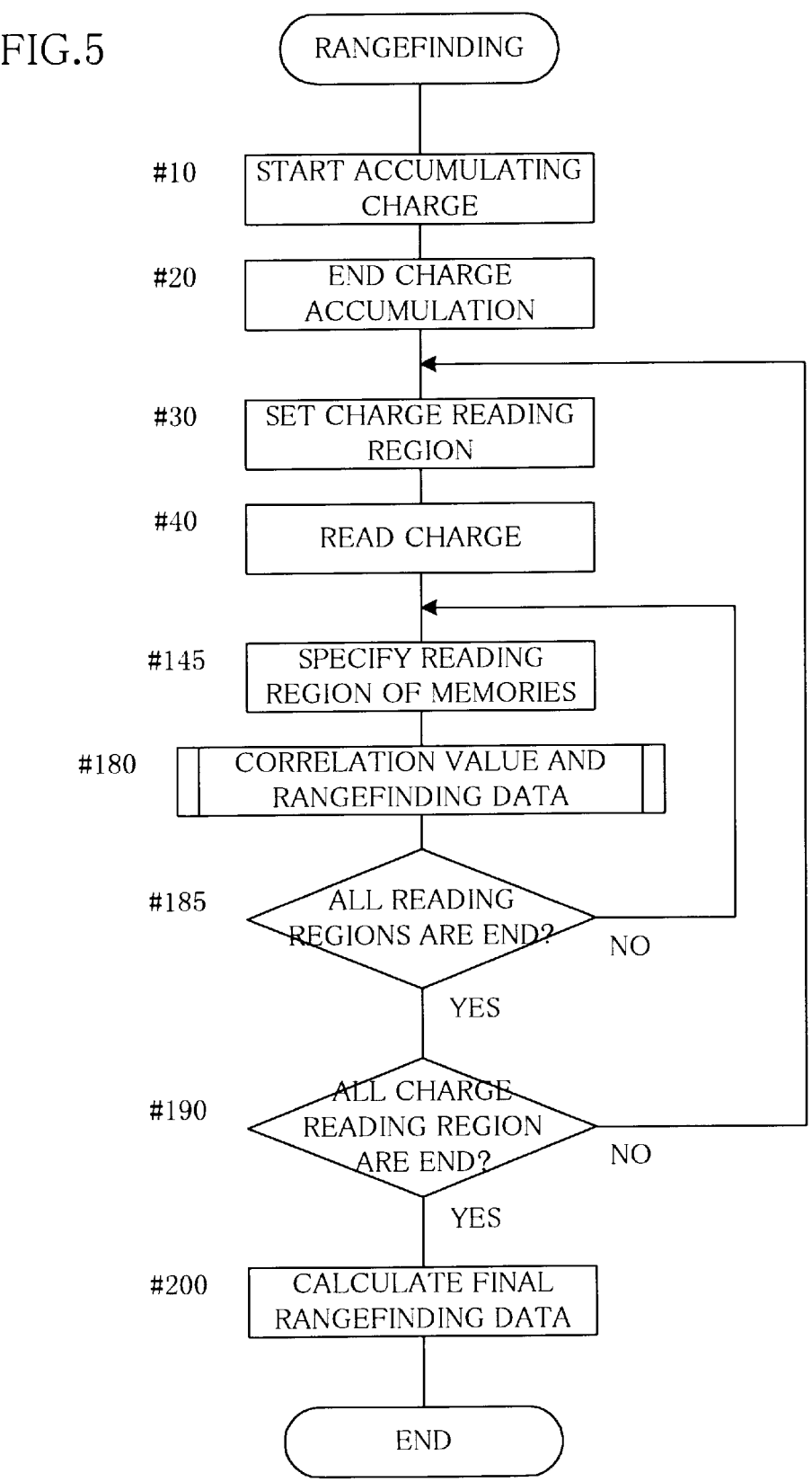
FIG. 5 is a flow chart showing a second rangefinding sequence.

The main process which differ from those of the first embodiment are described below with reference to FIG. 4 and the flow chart of a second rangefinding sequence of FIG. 5. That is, in FIG. 5, although the processes from step #145 differ from those of the first embodiment, since the repeated processes from step #30 to step #190 differ from those of the first embodiment, the present description begins with step #30.

After charge accumulation ends, first, reading controller 33 specifies the charge reading range for the left and right line sensors 31L and 31R using the reading start address and reading pixel number specified for the first reading range (step #30). The charges are separately read as image signals from the specific reading ranges of the left and right line sensors 31L and 31R specified as per above, and stored in left and right memories 41L and 41R via signal processor 34 (step #40).

Thereafter, reading controller 15 specifies via reading region specification unit 150 the reading regions of left and right memories 41L and 41R storing the pixel data of the first reading region (step #145). In this way the reading regions in both left and right memories 41L and 41R are specified.

In step #180, rangefinding data are calculated by an operation identical to steps #50 through #70 of the first embodiment.

Thereafter, the processes of steps #145 and #180 are repeated for the reading regions until the end (step #185).

The processes from step #30 to step #185 are repeated for the second reading region and third reading region until the end (step #190).

When the repeated processes end in step #190, the final rangefinding data are selected from the obtained rangefinding data by distance calculator 153 (step #200).

Figure 3:
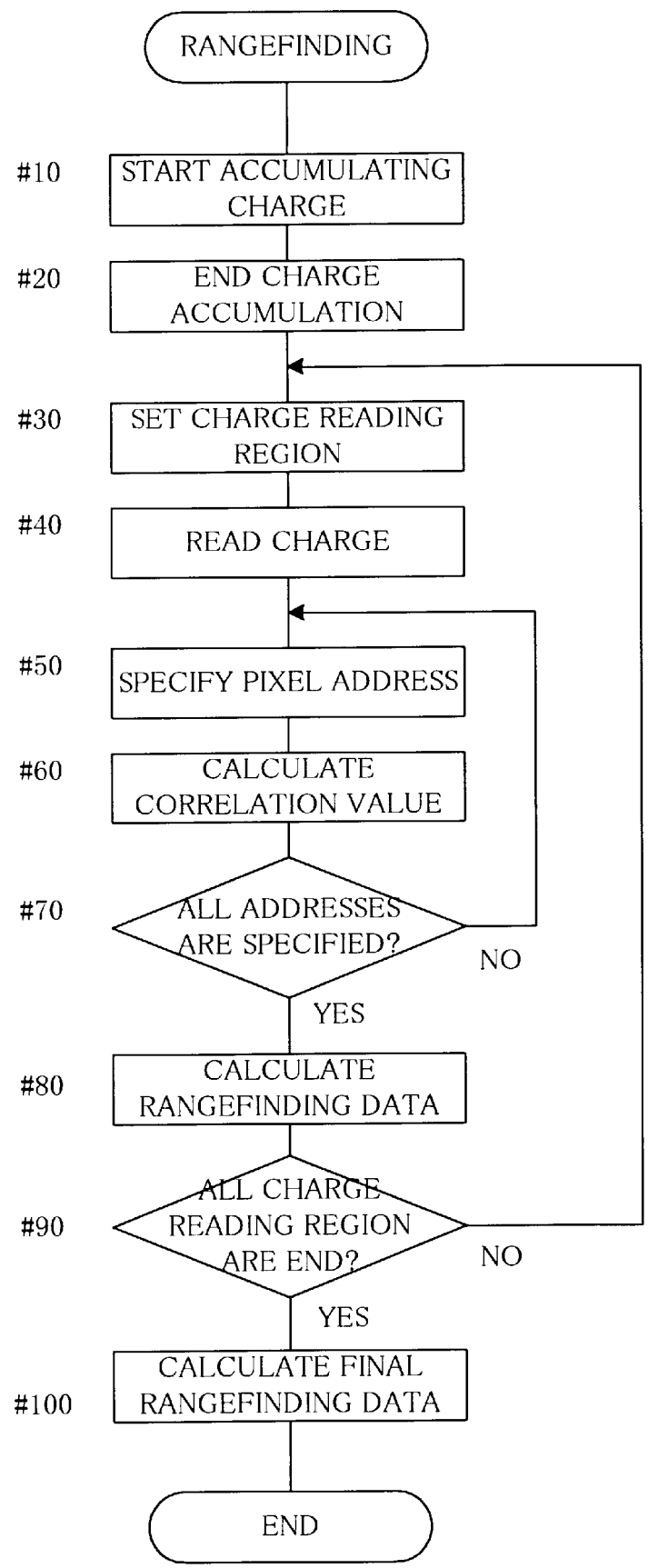
FIG. 3 is a flow chart showing a first rangefinding sequence.
Figure 6:
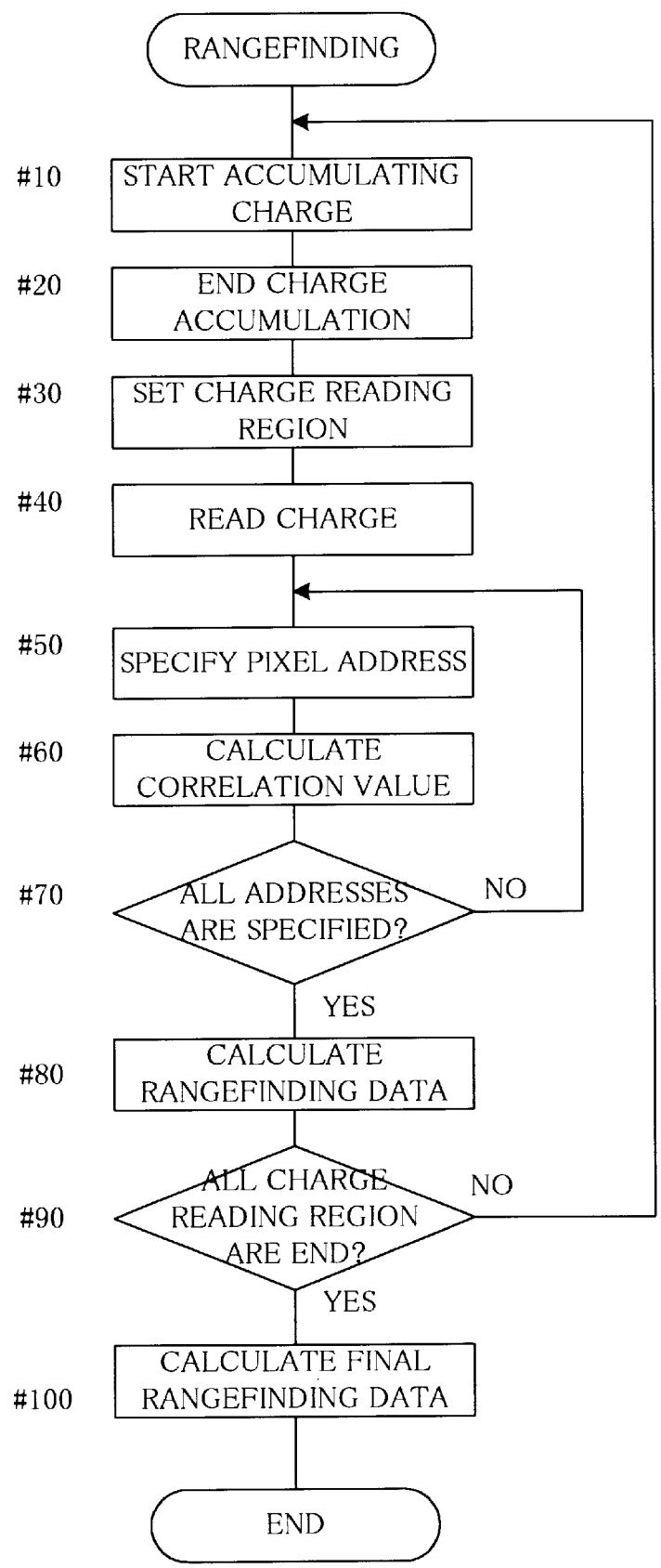
FIG. 6 is a flow chart showing a modification of the charge accumulation operation sequence related to the first rangefinding sequence.

Although the photoreception unit 32 performs the operation of charge accumulation for a required interval only a predetermined timing relative to the photoreceptor elements of left and right line sensors 31L and 31R in the first embodiment, as shown in FIG. 3, the present invention is not limited to this arrangement inasmuch as the operation of charge accumulation may be performed at required intervals only with a predetermined timing for each specification of a reading region of the first reading region, second reading region, and third reading region, as shown in FIG. 6. The modification of the flow chart of FIG. 6 relative to the flow chart of FIG. 3 can be adapted to the flow chart of FIG. 5. That is, the bifurcation "N" of step #190 may be modified from step #30 to step #10 in FIG. 5.

Figure 7:
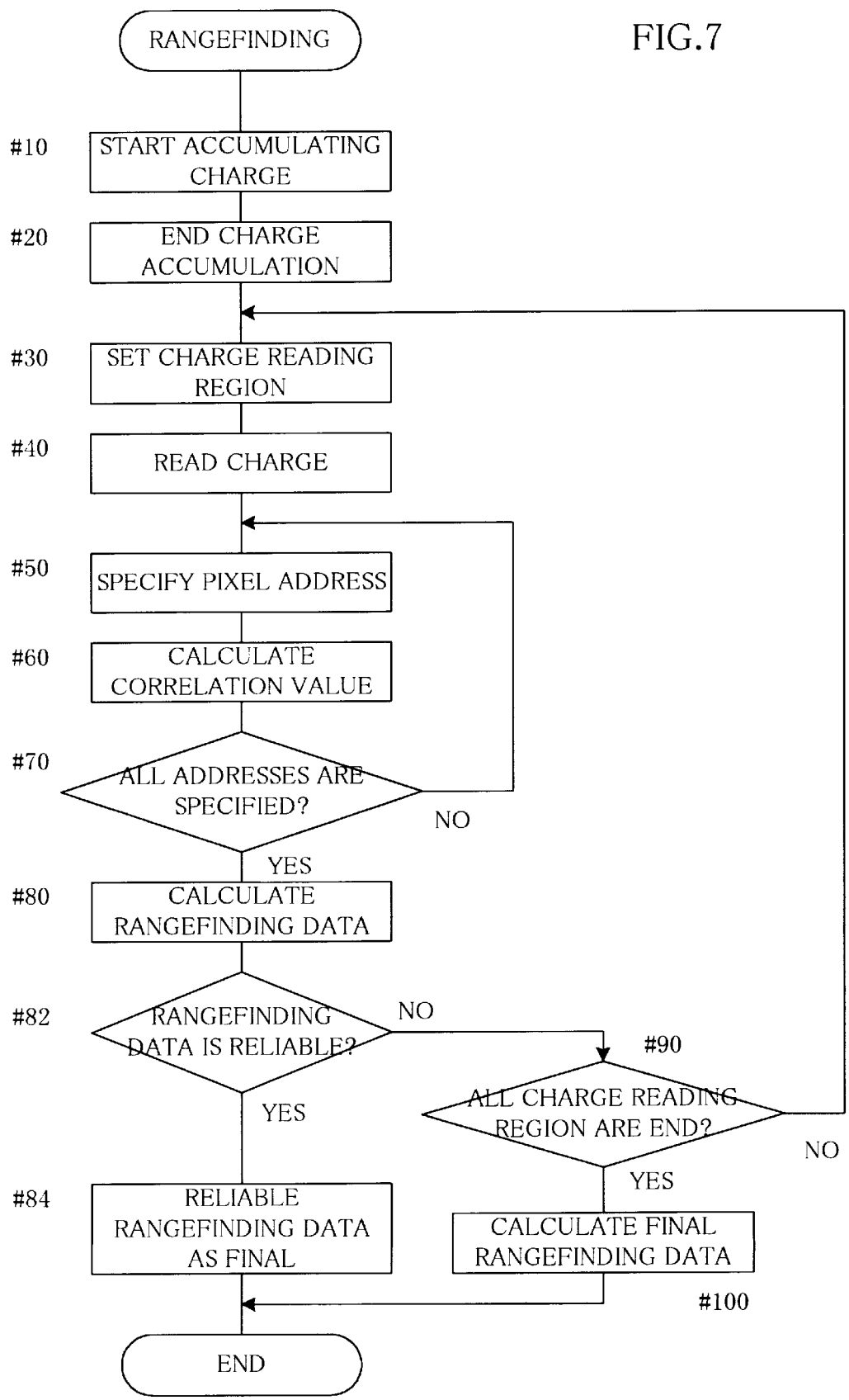
FIG. 7 is a flow chart adding steps to determine the reliability of rangefinding data related to the first rangefinding sequence.

Although the processes from step #30 to step #80 in the first embodiment are repeated until reading region specification ends for all reading regions of the first, second, and third reading regions (step #90), as shown in FIG. 3, the present invention is not necessarily limited to this arrangement inasmuch as the repeated processes may end at the stage where rangefinding data satisfying a standard of predetermined reliability are obtained in step #80. For example, when the determination of step #82 as to whether or not the rangefinding data obtained in step #80 satisfy a predetermined reliability standard is that such a standard is not satisfied, the routine may advance to step #90, as shown in FIG. 7, whereas when the reliability standard is satisfied, those rangefinding data satisfying the standard may be set as the final rangefinding data and the process ends (step #84). The region specification sequence in this instance may be such as to read from the center region in the sequence of second, first, third.

Furthermore, when the routine advances to step #100, it means rangefinding data satisfying a predetermined reliability standard have not been detected in step #82; in this instance also, providing step #10 is effective in selecting rangefinding data of the highest reliability from among the obtained rangefinding data even when a predetermined standard of reliability has not been satisfied. This effectiveness allows the setting of a higher predetermined standard of reliability in step #82, so as to realize a rangefinder capable of obtaining rangefinding data of high reliability even when processing ends after partial completion as in step #84. The modifications of the flow chart of FIG. 7 relative to the flow chart of FIG. 3 may also be adapted to the flow chart of FIG. 5.

Obviously, many modifications and variation of the present invention are possible in light of the above teachings. It is therefore to be understood that within the scope of the appended claims, the invention may be practiced other than as specifically described.

What is claimed is:

1. A measurement device, comprising:
   a pair of photoelectric conversion element arrays which receives light from an object;
   a signal controller which allocates information output from said photoelectric conversion element arrays to a plurality of areas, and controls each of said photoelectric conversion element arrays to only output information included in one of said allocated areas;
   a memory which stores said output information included in said one of said allocated areas; and
   a calculator which calculates data corresponding to object distance using said output information stored in said memory.

2. A measurement device as claimed in claim 1, wherein said memory has a storage capacity sufficient only to store said output information included in said one of said allocated areas.

3. A measurement device as claimed in claim 2, wherein said photoelectric conversion element arrays repeatedly receives light for each allocated area.

4. A measurement device as claimed in claim 1, further comprising a reading region specifying portion which specifies a reading region of said memory for use by said calculator.

5. A measurement device as claimed in claim 1, wherein said photoelectric conversion element arrays repeatedly receives light for each allocated area.

6. A measurement device as claimed in claim 1, further comprising a device for judging whether data calculated by said calculator satisfy a predetermined reliability.

7. A measurement device as claimed in claim 1, wherein said one of said allocated areas from each photoelectric element partially overlaps with an adjacent allocated area.

8. A shooting apparatus having a taking optical system, comprising:
   a pair of photoelectric conversion element arrays which receives light from an object;
   a signal controller which allocates information output from said photoelectric conversion element arrays to a plurality of areas, and controls each of said photoelectric conversion elements to output information included in one of said allocated areas;

a memory which stores said output information included in said one of said allocated areas;

a calculator which calculates data corresponding to object distance using said output information stored in said memory; and a controller which controls a driving of said taking optical system based on said calculated data.

9. A shooting apparatus as claimed in claim 8, wherein said memory has a storage capacity sufficient only to store said output information included in said one of said allocated areas.

10. A shooting apparatus as claimed in claim 9, wherein said photoelectric conversion element arrays repeatedly receives light for each allocated area.

11. A shooting apparatus as claimed in claim 8, further comprising a reading region specifying portion which specifies a reading region of said memory for use by said calculator.

12. A shooting apparatus as claimed in claim 8, wherein said photoelectric conversion element arrays repeatedly receives light for each allocated area.

13. A shooting apparatus as claimed in claim 8, further comprising a device for judging whether data calculated by said calculator satisfy a predetermined reliability.

14. A shooting apparatus as claimed in claim 8, wherein said one of said allocated areas from each photoelectric element partially overlaps with at least one adjacent allocated area.

15. A measuring method, comprising:

a photoreception step of receiving light from an object by a pair of photoelectric conversion element arrays;

a reading step of dividing data corresponding to said received light into a plurality of areas;

a storage step of storing data included in one of said divided areas; and a calculation step of calculating data related to the distance to an object using said stored data included in said one of said divided areas.

16. A measuring method as claimed in claim 15, wherein said storage step and said calculation step are repeated for each of said divided areas.

17. A measurement device is claimed in claim 1, wherein said signal controller controls each of said photoelectric conversion element arrays to only output information included in another one of said allocated areas, said memory storing said output information included in said another one of said allocated areas, and said calculator calculating data correspond to object distance using said output information included in said another one of said allocated areas and stored in said memory.

18. A measurement device for performing successive measurement cycles, comprising:

a pair of photoelectric conversion element arrays for receiving light from an object;

a signal controller for allocating information output from said photoelectric conversion element arrays to a plurality of areas, said signal controller also for controlling each of said photoelectric conversion element arrays during a first cycle to only output information included in one of said allocated areas, said signal controller also for controlling each of said photoelectric conversion element arrays during a second cycle to only output information included in another one of said allocated areas;

a memory for only storing said output information in said one of said allocated areas during said first cycle, said memory for only storing said output information in said another one of said allocated areas during said second cycle; and a calculator for calculating data corresponding to object distance during said first cycle by using said output information included in said one of said allocated areas and stored in said memory, said calculator for calculating data corresponding to object distance during said second cycle by using said output information included in said another one of said allocated areas and stored in said memory.

19. A measurement apparatus, comprising:

a pair of photoelectric conversion element arrays which receive light from an object;

a signal controller which outputs only part of information obtained by said photoelectric conversion element arrays;

a memory which has a capacity only to store said output information; and a calculator which calculates data corresponding to object distance using said output information stored in said memory.

* * * * *